May 14, 1968 E. E. WALLACE 3,382,675
TANDEM MASTER CYLINDER
Filed March 16, 1966
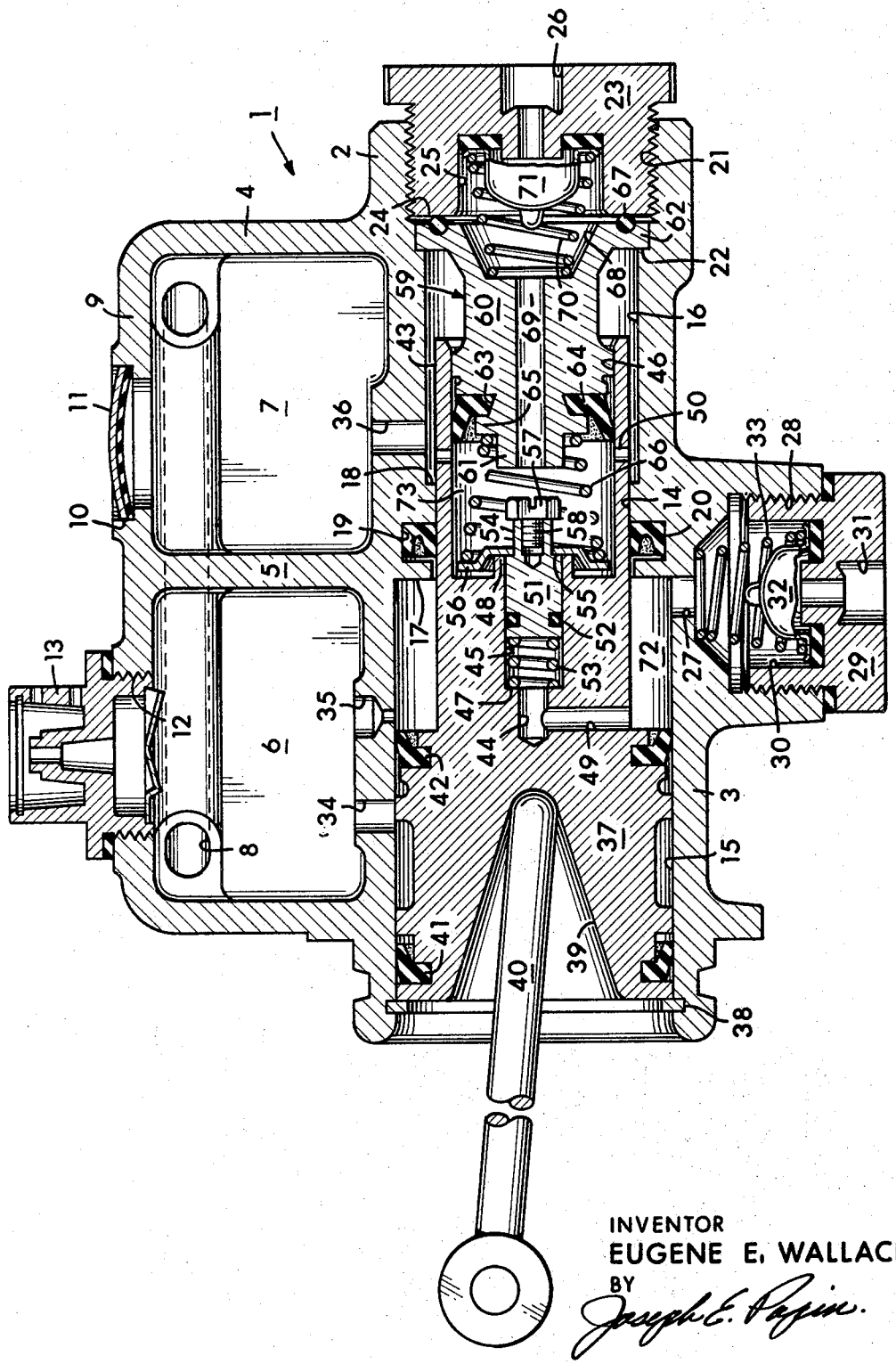
INVENTOR
EUGENE E. WALLACE
BY
Joseph E. Papin 
United States Patent Office 3,382,675
Patented May 14, 1968

3,382,675
TANDEM MASTER CYLINDER
Eugene E. Wallace, Kirkwood, Mo., assignor, by mesne assignments, to Wagner Electric Corporation, South Bend, Ind., a corporation of Delaware
Filed Mar. 16, 1966, Ser. No. 538,487
12 Claims. (Cl. 60—54.6)

ABSTRACT OF THE DISCLOSURE

A tandem master cylinder having movable piston means defining therewith a pair of fluid pressure chambers, and an equalizing piston movable in said piston means for substantially equalizing the magnitudes of fluid pressures established in said pair of fluid pressure chambers.

---

This invention relates to fluid pressure systems and more particularly to a tandem master cylinder for use in a dual fluid pressure system.

The principal object of the present invention is to provide a tandem master cylinder of relatively short overall length in comparison to conventional designs which includes means therein for automatically compensating for differences in displacement volumes between the two separate branches of the system and maintains the established fluid pressures in said separate branches substantially equal.

Another object of the present invention is to provide a tandem master cylinder with piston means movable therein which establishes fluid pressure in the fluid pressure chambers respectively connected to the separate branches of a dual fluid pressure system substantially simultaneously, and means in said piston means being movable in response to the established fluid pressures in said chambers to substantially balance the magnitudes thereof.

Another object of the present invention is to provide a tandem master cylinder with a housing having piston a means movable therein and defining of pair of separate fluid pressure chambers therewith for supplying fluid pressure to the separate branches of a dual fluid pressure system, said piston means being movable in response to the initial brake pedal stroke to establish fluid pressure in said chambers substantially simultaneously, and other piston means having opposed end areas responsive to fluid pressure in said separate chambers being movable in said piston means to compensate for differences in displacement volumes and maintain the fluid pressure in the separate branches substantially equal.

Still another object of the present invention is to provide a tandem master cylinder of simplified construction and economy of manufacture.

Briefly, the present invention comprises a tandem master cylinder having a housing, piston means movable in said housing and defining therewith a pair of fluid pressure chambers, said piston means being movable in response to an applied force toward a position establishing fluid pressure in said chambers, and means movable in said piston means in response to the established fluid pressure in aid chambers for substantially equalizing the magnitudes thereof.

These and other objects and advantageous features will become apparent hereinafter by referring to the appended specification and the accompanying drawing which is a cross-sectional view of a tandem master cylinder embodying the present invention.

A tandem master cylinder or fluid pressure generating means 1 is provided with a housing 2 having integrally formed cylinder and reservoir portions 3, 4 therein. A transversely extending wall 5 is provided on the housing 2 dividing the reservoir portion 4 into separate sump chambers 6, 7, and a conduit 8 connects said sump chambers in pressure fluid communication and prevents the loss of pressure fluid in one of the sump chambers in the event of loss of pressure fluid in the other chamber. An upper wall 9 of the reservoir portion 4 is provided with an opening 10 connecting with the sump chamber 7 and sealed by a disc member 11, and another opening 12 is provided in said upper wall connecting with sump chamber 6 and a filler cap 13 is removably secured in the opening 12.

A bore 14 is provided in the cylinder portion 3 axially interposed between counterbores 15, 16, said bore and counterbores defining opposed annular shoulders 17, 18 at the respective junctures thereof, and an annular groove 19 having a seal 20 therein is provided in said bore adjacent to the shoulder 17. Another counterbore 21 connects with the rightward end of the counterbore 16 forming an annular shoulder or abutment 22 at the juncture thereof, and a plug or closure member 23 having an inner or abutment end 24 and an axially aligned recess and outlet port 25, 26 extending therethrough is threadedly received in the rightward end of the counterbore 21. A vertically aligned bore and counterbore 27, 28 is provided in the cylinder portion 3 connecting with the counterbore 15 adjacent to the shoulder 17, and another plug member 29 having a vertically aligned recess and outlet port 30, 31 therein is threadedly received in the counterbore 28. A check valve and seal assembly 32 is provided in the recess 30, and a spring 33 biased between the end wall of the counterbore 28 and said check valve and seal assembly normally urges said check valve and seal assembly to a position abutting the plug member 29 about the outlet port 31. Axially spaced supply and compensating ports 34, 35 are provided in the housing 2 connected between the sump chamber 6 and the housing counterbore 15 adjacent to the mid-portion thereof, and a supply passage 36 is also provided in said housing connected between the sump chamber 7 and the housing counterbore 16 adjacent to the annular shoulder 18.

A primary piston assembly 37 is slidably received in the housing counterbore 15 and retained against displacement therefrom by a snap ring and groove assembly 38 provided in said housing counterbore adjacent to the leftward end thereof, and an axially extending recess 39 is provided in the leftward end of said piston to pivotally receive the driving end of an operator controlled push rod 40. A secondary piston seal 41 is carried on the piston 37 adjacent to the leftward end thereof closing the housing counterbore 15, and a primary seal 42 is carried on said piston adjacent to the mid-portion thereof in sealing engagement with the housing counterbore 15. The piston 37 is provided with an extension portion 43 which extends coaxially into the bore 14 and counterbore 16, and the seal 20 sealably engages the periphery of said extension adjacent to the mid-portion thereof. A blind bore 44 and stepped counterbores 45, 46 extend through the rightward end of the piston extension 43, said bore and the counterbore 45 forming an annular shoulder 47 at the juncture thereof, and said counterbores defining an axially extending abutment portion 48 at the juncture thereof. A cross-passage 49 extends through the piston extension 43 between the peripheral surface thereof and the blind bore 44, and a plurality of compensating ports 50 extend radially through said extension between the peripheral surface thereof and the counterbore 46 adjacent to the mid-portion of said extension.

A floating piston or fluid pressure equalizing means 51 is slidably received in the piston extension counterbore 45 including an O-ring 52 on the periphery thereof in sealing engagement with said counterbore, and a return spring 53 provided in said counterbore is biased between the shoulder 47 and the leftward end of said floating piston normally urging said floating piston rightwardly. An extension 54 is provided on the rightward end of the floating piston 51 forming an abutment shoulder 55 at the juncture of said extension and the rightward end of said floating piston, and a spring retaining member 56 is provided on said extension axially interposed between said shoulder and a head member 57 removably secured to the rightward end of said extension by suitable means, such as a screw 58.

A spool member, indicated generally at 59, is provided with a stepped body portion 60 having opposed end portions 61, 62 which are received in the piston extension counterbore 46 and the housing counterbore 21, respectively. The spool member leftward end 61 is provided with a groove 63 having an annular seal 64 therein which sealably engages the extension counterbore 46, and a radial flange portion 65 on said spool member extends into said groove leftwardly of said annular seal. A return spring 66 is biased between the flange portion 65 and the spring retaining member 56 normally urging said spring retaining member into engagement with the shoulder 55 on the floating piston 51 and normally urging said spring retaining member and said floating piston leftwardly to abuttingly engage said spring retaining member with the abutment portion 48 on the piston extension 43. The spool member rightward end 62 abuttingly engages the housing shoulder 22, and a seal 67 provided in said spool member rightward end adjacent the periphery thereof sealably engages the inner end 24 of the plug member 23. An axially extending recess 68 is provided in the spool member rightward end 62 connecting with a bore or passage 69 which extends through the spool member 60, and a spring 70 is received in said recess to bias a check valve and seal assembly 71 provided in the recess 25 of the plug member 23 into engagement with said plug member about the outlet port 26. It should be noticed that a fluid pressure generating chamber 72 is defined in the housing counterbore 15 between the piston seal 42 and the annular seal 20 in open pressure fluid communication with the outlet port 31 and normally connected with the sump chamber 6 through the compensating port 35 and that another fluid pressure generating chamber 73 is defined in the piston extension counterbore 46 between the end wall of the counterbore 46 and the seal 64 on the spool member 60 in open pressure fluid communication with the outlet port 26 through the passage 69, and normally connected with the sump chamber 7 through the supply port 36, housing counterbore 16, and the compensating ports 50. To complete the description of the tandem master cylinder 1, it should be also noticed that the piston primary seal 42 and compensating port 35 define a valve controlling pressure fluid communication between the fluid pressure generating chamber 72 and the sump chamber 6 and that the seal 64 and the compensating ports 50 define another valve controlling pressure fluid communication between the fluid pressure generating chamber 73 and the sump chamber 7.

In the normal operation of the tandem master cylinder 1 with the component parts in their original positions, as shown in the drawing and as hereinabove described, a manually applied force to the push rod 40 urges the piston 37 and the extension 43 rightwardly, whereby the primary seal 42 passes the compensating port 35 to close the valve defined thereby and interrupt pressure fluid communication between the sump chamber 6 and the fluid pressure chamber 72. This rightward movement of the extension 43 also serves to move the compensating ports 50 past the seal 64 to close the valve defined thereby and interrupt pressure fluid communication between the sump chamber 7 and the fluid pressure chamber 73 substantially simultaneously with the closing of the compensating port 35. After the compensating ports 35 and 50 are closed, the rightward movement of the piston 37 and extension 43 establishes fluid pressure in the chambers 72, 73, and the fluid pressure in the chamber 72 is displaced through the vertical bore and counterbore 27, 28, check valve 32 and outlet port 31 to one branch of the dual fluid pressure system, and the fluid pressure in the chamber 73 is displaced through the passage 69, check valve 71 and outlet port 26 to the other branch of the dual fluid pressure system. Since the volume of pressure fluid to be displaced from the chambers 72, 73 will depend on the adjustments of the various brakes, the pressure fluid displaced from said chambers probably will be different and the fluid pressure developed in said chambers will also be different. Since the rightward end of the equalizing piston 51 extends into the chamber 73 and the leftward end of said equalizing piston is in pressure fluid communication with the chamber 72 through the cross-passages 49, the blind bore 44 and the counterbore 45, said equalizing piston is movable in response to this fluid pressure differential in said chambers to increase the fluid pressure in one of said chambers while decreasing the fluid pressure in the other of said chambers to equalize or balance the fluid pressure in said chambers acting on the opposed ends thereof.

When the desired braking effect is obtained, the manually applied force is removed from the push rod 40 permitting the return of displaced pressure fluid through the outlet ports 26, 31 into the pressure fluid chambers 73, 72, respectively, and the piston 37 and extension 43 are returned to their original positions by the return spring 66, and the qualizing piston 51 is returned to its original position in the counterbore 45 by the return springs 66 and 53. As the manually applied force is removed, a partial vacuum may be momentarily created in the chambers 72, 73, and the flow of pressure fluid from the sump chambers 6, 7 through the supply ports 34, 36 into the counterbore 15 between the primary and secondary seals 42, 41 on the piston 37, and into the chamber defined by the counterbore 16, the spool member 60 and the annular seal 64, respectively, permits pressure fluid compensation in the fluid pressure chambers 72, 73. This pressure fluid compensation in the chambers 72, 73 is accomplished by the partial vacuum therein collapsing the lips of the primary seal 42 and the annular seal 64 to permit pressure fluid flow from the counterbore 15 past said primary seal into the chamber 72 and from the chamber defined by the counterbore 16, spool member 60 and annular seal 64 past said annular seal into the chamber 73.

It should be understood that the brakes connected with one branch of the dual fluid pressure system will remain operative and will be effective to establish a safe braking of the vehicle if the other branch of the fluid pressure system fails.

In the event of a leak in the fluid pressure branch connected with the outlet port 31, the applied force on the push rod 40 urges the piston 37 and extension 43 rightwardly to close the compensating ports 35 and 50, as previously described, but the rightward movement of the piston 37 fails to establish fluid pressure in the chamber 72. The rightward movement of the extension 43 establishes fluid pressure in the chamber 73, and since there is no fluid pressure in the chamber 72 to act on the leftward end of equalizing piston 51, said piston moves leftwardly in the counterbore 45 to compress the spring 53 to its solid position so that said piston is effectively in abutting engagement with the shoulder 47 to limit the leftward movement of said piston. The piston 51 thereby serves as a fixed portion of the extension 43 and said piston is held in this inoperative position by the fluid pressure in the chamber 73 acting on the rightward end thereof. Thereafter, the rightward movement of the extension 43 will establish fluid pressure in the chamber 73 which is not reduced or affected by movement of the piston 51, and the established fluid pressure is displaced through passage 69, check valve 71 and therefrom through the outlet port 26 to the fluid pressure branch connected therewith to effect a safe braking of the vehicle.

In the event of a leak in the fluid pressure branch connected with the outlet port 26, the applied force on the push rod 40 urges the piston 37 and the extension 43 rightwardly to close the compensating ports 35 and 50, as previously described. The rightward movement of the piston 37 establishes fluid pressure in the chamber 72, but the rightward movement of the extension 43 fails to establish fluid pressure in the chamber 73. The established fluid pressure in the chamber 72 acts on the leftward end of the piston 51 to urge it rightwardly, and since there is no fluid pressure established in the chamber 73 to resist this rightward movement, the head 57 engages the spool member leftward end 61 about the passage 69 and the leftward end of the piston 51 thereby serves as a fixed portion of the chamber 72. Thereafter, the rightward movement of the piston 37 and extension 43 continues to establish fluid pressure in the chamber 72 which is not reduced or affected by movement of the piston 51 and the established fluid pressure is displaced through the vertical bore and counterbore 27, 28, check valve 32 and therefrom through the outlet port 31 to the branch connected therewith to effect a safe braking of the vehicle.

From the foregoing, it is now apparent that a novel tandem master cylinder meeting the objects set out hereinbefore is provided and that changes or modifications as to the precise configurations, shapes an ddetails of construction set forth in the disclosure by way of illustratration may be made by those skilled in the art without departing from the spirit of the invention, as defined by the claims which follow.

The embodiments of the invention in which an exclusive property or privilege is claimed are defined as follows:

1. A tandem master cylinder comprising a housing, piston means movable in said housing and defining therewtih a fluid pressure chamber, extension means on said piston means extending through said chamber and having a free end thereon exteriorly of said chamber, other extension means on said housing in opposed relation with said first named extension means and substantially concentric with said free end thereof, another fluid pressure chamber defined between said first named and other extension means, said piston means and first named extension means being movable relative to said other extension means in response to an applied force toward positions establishing fluid pressures in said first named and other chambers, respectively, and means movable between said first named and other chambers in response to the established fluid pressures therein to reduce any differential between the magnitudes of the establishing fluid pressures.

2. A tandem master cylinder comprising a housing, piston means movable in said housing and defining therewith a fluid pressure generating chamber, extension means on said housing and substantially coaxial with said piston means, another fluid pressure generating chamber defined between said extension means and piston means, said piston means being movable relative to said extension means in response to an applied force toward a position establishing fluid pressures in said first named and other chambers, respectively, and equalizing means movable in said piston means in response to the established fluid pressures in said first named and other chambers to substantially equalize the magnitudes thereof.

3. The tandem master cylinder according to claim 2, including a bore in one end of said piston means, said extension means extending into said bore and defining therewith said other fluid pressure chamber.

4. The tandem master cylinder according to claim 2, including a bore in said piston means and connected between said first named and other chambers, said equalizing means being movable in said bore and having opposed surfaces thereon respectively responsive to the established fluid pressures in said first named and other chambers.

5. The tandem master cylinder according to claim 4, wherein said equalizing means includes other piston means movable in said bore and having opposed ends, said opposed surfaces being defined on said other piston means opposed ends.

6. The tandem master cylinder according to claim 4, comprising means on said equalizing means extending into said other chamber for displacement preventing engagement with said extension means, said equalizing means being movable in response to established fluid pressure in said first named chamber to engage said last named means with said extension means preventing displacement of said equalizing means from said bore upon the failure of established fluid pressure in said other chamber.

7. The tandem master cylinder according to claim 2, including a pressure fluid reservoir in said housing having a pair of separate sump chambers, one of said sump chambers being normally connected in pressure fluid communication with said first named fluid pressure generating chamber, the other of said sump chambers being normally connected in pressure fluid communication with said other fluid pressure generating chamber, said piston means being movable relative to said extension means in response to the applied force toward a position interdupting pressure fluid communication between said one and other sump chambers and said first named and other fluid pressure generating chambers, respectively.

8. The tandem master cylinder according to claim 2, including a pressure fluid reservoir in said housing having a pair of separate sump chambers, passage means in said housing normally connecting one of said sump chambers in pressure fluid communication with said first named fluid pressure generating chamber, and means in said housing including said piston means defining other passage means normally connecting the other of said sump chambers in pressure fluid communication with said other fluid pressure generating chamber, said piston means being movable relative to said extension means in response to the applied force toward a position interrupting pressure fluid communication between said first named and other fluid pressure generating chambers and said first named and other passage means, respectively.

9. The tandem master cylinder according to claim 8, including a bore in one end of said piston means, sealing means on said extension means in sealing engagement with said bore and defining said other fluid pressure chamber therein, said other passage means including a passage in said piston means normally connecting said other sump chamber with said other fluid pressure chamber, said piston means being movable in response to the applied force to move said passage toward a position past said sealing means to interrupt pressure fluid communication between said other sump chamber and said other fluid pressure chamber.

10. The tandem master cylinder according to claim 8, wherein said other passage means includes a third chamber in said housing in pressure fluid communication with said other sump chamber, and a passage in said piston means and movable therewith between a normal position connecting said other fluid pressure generating chamber and said third chamber in pressure fluid communication and an applied position wholly within said third chamber to interrupt pressure fluid communication between said other fluid pressure generating chamber and said third chamber, said passage being movable toward its applied position in response to the applied force movement of said piston means.

11. The tandem master cylinder according to claim 9, comprising sealing means on said extension means in sealing engagement with said piston means, said passage being movable from its normal position past said sealing means toward its applied position within said third chamber.

12. A fluid pressure generating device comprising a housing, means movable in said housing and defining therewith a fluid pressure chamber including other means extending exteriorly of said chamber, means on said housing in opposed relation to said other means and defining within said other means another fluid pressure chamber, said first named means being movable in response to an applied forced toward a position establishing fluid pressures in said first named and other chambers, respectively, and movable means between said first named and other chambers responsive to the established fluid pressures to substantially equalize the magnitudes thereof.

References Cited

UNITED STATES PATENTS

| | | | |
|---|---|---|---|
| 1,010,000 | 11/1911 | Snyder | 60—54.5 XR |
| 1,495,231 | 5/1924 | Loughead | 60—54.6 XR |
| 1,774,818 | 9/1930 | Strothmann | 60—54.6 |
| 2,152,074 | 3/1939 | McInnerney | 60—54.5 XR |
| 2,216,124 | 10/1940 | Main | 60—54.6 XR |
| 3,172,265 | 3/1965 | Randol | 60—54.6 |
| 3,321,055 | 5/1967 | Randol | 60—54.6 XR |

MARTIN P. SCHWADRON, *Primary Examiner.*

ROBERT R. BUNEVICH, *Examiner.*